(12) United States Patent
Korman et al.

(10) Patent No.: US 9,767,270 B2
(45) Date of Patent: Sep. 19, 2017

(54) METHOD FOR DYNAMIC GENERATION AND MODIFICATION OF AN ELECTRONIC ENTITY ARCHITECTURE

(71) Applicant: SERENTIC LTD., Kfar Saba (IL)

(72) Inventors: David Korman, Kfar Saba (IL); Efraim Sasson, Kfar Tavor (IL)

(73) Assignee: SERENTIC LTD., Kfar Saba (IL)

( * ) Notice: Subject to any disclaimer, the term of this patent is extended or adjusted under 35 U.S.C. 154(b) by 390 days.

(21) Appl. No.: 14/399,166

(22) PCT Filed: May 6, 2013

(86) PCT No.: PCT/IL2013/050382
§ 371 (c)(1),
(2) Date: Nov. 6, 2014

(87) PCT Pub. No.: WO2013/168148
PCT Pub. Date: Nov. 14, 2013

(65) Prior Publication Data
US 2015/0161379 A1    Jun. 11, 2015

Related U.S. Application Data

(60) Provisional application No. 61/688,084, filed on May 8, 2012, provisional application No. 61/742,029, filed on Aug. 2, 2012.

(51) Int. Cl.
*G06F 15/16* (2006.01)
*G06F 21/46* (2013.01)
(Continued)

(52) U.S. Cl.
CPC .............. *G06F 21/46* (2013.01); *G06F 21/55* (2013.01); *G06F 21/76* (2013.01); *G06F 21/87* (2013.01);
(Continued)

(58) Field of Classification Search
USPC .......................................................... 706/12
See application file for complete search history.

(56) References Cited

U.S. PATENT DOCUMENTS 5,630,057 A   5/1997   Hait
5,870,588 A   2/1999   Rompaey et al.
(Continued)

FOREIGN PATENT DOCUMENTS

WO   2006026676    3/2006
WO   2010/129475   11/2010
(Continued)

OTHER PUBLICATIONS

TSV protection: Towards secure 3D-MPSoC Johanna Sepúlveda; Guy Gogniat; Daniel Flórez; Jean-Philippe Diguet; Ricardo Pires; Marius Strum 2015 IEEE 6th Latin American Symposium on Circuits & Systems (LASCAS) Year: 2015 pp. 1-4, DOI: 10.1109/LASCAS.2015.7250419 IEEE Conference Publications.*
(Continued)

*Primary Examiner* — Michael B Holmes
(74) *Attorney, Agent, or Firm* — Mark M. Friedman

(57) ABSTRACT

The subject matter discloses a method for generating a new dynamic function embedded within a chip, wherein the chip comprises a plurality of a building blocks, a first function, and a specification defining the new dynamic function; the method comprising the steps of: within the chip, performing the first function in accordance with the specification and/or analysis; and within the chip, generating the new dynamic function upon the performing the first function.

6 Claims, 7 Drawing Sheets

(51) Int. Cl.
*G06F 21/55* (2013.01)
*H04L 29/06* (2006.01)
*G06F 21/87* (2013.01)
*G06F 21/76* (2013.01)

(52) U.S. Cl.
CPC ........ *H04L 63/20* (2013.01); *G06F 2221/032* (2013.01)

(56) References Cited

U.S. PATENT DOCUMENTS

| | | | |
|---|---|---|---|
| 5,896,499 A | 4/1999 | McKelvey | |
| 7,068,168 B2* | 6/2006 | Girshovich | G08B 13/1436 340/539.1 |
| 7,484,086 B2 | 1/2009 | Hasui | |
| 7,607,025 B1 | 10/2009 | Trimberger | |
| 8,132,257 B2 | 3/2012 | Li et al. | |
| 8,160,864 B1 | 4/2012 | Nemecek et al. | |
| 8,407,633 B2 | 3/2013 | Courchesne et al. | |
| 8,438,416 B2* | 5/2013 | Kocev | G06F 1/3237 713/322 |
| 2002/0073380 A1 | 6/2002 | Cooke et al. | |
| 2005/0018472 A1 | 1/2005 | Lim | |
| 2006/0015862 A1 | 1/2006 | Odom et al. | |
| 2006/0114110 A1* | 6/2006 | Girshovich | G08B 13/1436 340/568.3 |
| 2007/0098153 A1 | 5/2007 | Nishikawa | |
| 2008/0228580 A1* | 9/2008 | Korman | G06Q 30/0226 705/14.27 |
| 2008/0301344 A1 | 12/2008 | Hsieh | |
| 2009/0006272 A1* | 1/2009 | Korman | G06Q 40/02 705/36 R |
| 2010/0010706 A1 | 1/2010 | Gormley | |
| 2010/0017881 A1 | 1/2010 | Goyet | |
| 2011/0093958 A1 | 4/2011 | Devictor | |
| 2011/0154032 A1 | 6/2011 | Mauro, II | |
| 2011/0154501 A1 | 6/2011 | Banginwar et al. | |
| 2011/0258247 A1 | 10/2011 | Gordon | |
| 2012/0002803 A1 | 1/2012 | Adi et al. | |
| 2012/0086471 A1 | 4/2012 | Snyder et al. | |
| 2012/0102344 A1* | 4/2012 | Kocev | G06F 1/3237 713/322 |
| 2015/0113602 A1* | 4/2015 | Korman | G06F 21/44 726/4 |
| 2015/0161379 A1* | 6/2015 | Korman | G06F 21/55 726/1 |

FOREIGN PATENT DOCUMENTS

| | | |
|---|---|---|
| WO | 2010/138745 | 12/2010 |
| WO | 2012/119218 | 9/2012 |
| WO | 2013008230 | 1/2013 |

OTHER PUBLICATIONS

Design Space Exploration for a Co-designed Accelerator Supporting Homomorphic Encryption Ghada Abozaid; Ahmed El-Mandy 2015 20th International Conference on Control Systems and Computer Science Year: 2015 pp. 431-438, DOI: 10.1109/CSCS.2015.14 IEEE Conference Publications.*

Asynchronous implementation of 1024-bit modular processor for RSA cryptosystem Young Sae Kim; Woo Seok Kang; Jun Rim Choi Proceedings of Second IEEE Asia Pacific Conference on ASICs. AP-ASIC 2000 (Cat. No. 00EX434) Year: 2000 pp. 187-190, DOI: 10.1109/APASIC.2000.896940 IEEE Conference Publications.*

Anonymous: "Field-programmable gate array—Wikipedia, the free encyclopedia", May 4, 2012 (May 4, 2012), XP055240775, Retrieved from the Internet: URL:https://en.wikipedia.org/w/index.php?title=Fieldprogrammable_.

* cited by examiner

METHOD FOR DYNAMIC GENERATION AND MODIFICATION OF AN ELECTRONIC ENTITY ARCHITECTURE

FIELD OF THE INVENTION

The present disclosure relates to electronic entities in general, and to the architecture and behavior of electronic entities in particular.

BACKGROUND

Secure access to computerized devices and to digital data is typically implemented by providing passwords and/or keys, which can be duplicated from one device to another. In some cases a one-time password (OTP) is used. A one-time password (OTP) is a password that is typically valid for only one login session or transaction. The OTP can be generated based on time-synchronization between the authentication server and the client providing the password, by using a mathematical algorithm for generating a new password based on the previous password and/or seeds and by using a mathematical algorithm. The new password is based on a random number or seeds chosen by the authentication server or by applying transaction details and/or a counter.

Unified Threat Management (UTM) is a comprehensive solution that has recently emerged in the network security industry, and since 2004 it has gained widespread currency as a primary network gateway defense solution for organizations. In theory, UTM is the evolution of the traditional firewall into an all-inclusive security product able to perform multiple security functions within one single appliance: network firewalling, network intrusion prevention and gateway antivirus (AV), gateway anti-spam, Virtual Private Network (VPN), content filtering, load balancing, data leak prevention and on-appliance reporting.

Security is typically managed by a system administrator, who is able to change the configuration by gaining privileged access rights.

Typically a device or application switches between secured mode, in which the security mechanism is operated, and user mode.

PCT application WO2013008230 discloses anti-tampering protection assembly for sensing tampering with at least one conductor.

PCT application WO2006/026676 discloses circuits that are tolerated to software errors.

BRIEF SUMMARY

The subject matter discloses a method for generating a new dynamic function embedded within a chip, wherein said chip comprises a plurality of a building blocks, a first function, and a specification defining said new dynamic function; the method comprising the steps of: within said chip, performing said first function in accordance with said specification; and within said chip, generating said new dynamic function upon said performing said first function. According to some embodiments the method further comprising utilizing said building blocks for said generation of said new function. According to some embodiments the method for modifying an architecture of a dynamic function embedded within a chip; the method comprising the steps of: within said chip, challenging said dynamic function and providing challenging-results; within said chip analyzing said challenging-results and providing analysis-results; and within said chip, modifying an architecture of said dynamic function in accordance with said analysis-results. According to some embodiments the challenging being related to at least one member of a group consisting of a security aspect of said dynamic function, a performance aspect of said dynamic function, a usability aspect of said dynamic function an environment aspect of said dynamic function and a maintainability aspect of said dynamic function. According to some embodiments the analyzing and said challenging is being performed by said dynamic function. According to some embodiments the analyzing and said challenging is being performed by one or more other dynamic functions within said chip. According to some embodiments modifying an architecture of a dynamic function embedded within a chip; the method comprising the steps of within said chip, analyzing a security aspect associated with said dynamic function and providing a result; and within said chip, modifying an architecture of said dynamic function in accordance with said result.

The subject matter further discloses a method for modifying an architecture of a dynamic function embedded within a chip; the method comprising the steps of within said chip, analyzing a performance aspect associated with said dynamic function and providing a result; and within said chip, modifying an architecture of said dynamic function in accordance with said result.

The subject matter further discloses a method for modifying an architecture of a dynamic function embedded within a chip; the method comprising the steps of within said chip, analyzing a maintainability aspect associated with said dynamic function and providing a result; and within said chip, modifying an architecture of said dynamic function in accordance with said result.

The subject matter further discloses a method for modifying an architecture of a dynamic function embedded within a chip; the method comprising the steps of within said chip, analyzing a usability aspect associated with said dynamic function and providing a result; and within said chip, modifying an architecture of said dynamic function in accordance with said result.

The subject matter further discloses a method for modifying an architecture of a dynamic function embedded within a chip; the method comprising the steps of within said chip, analyzing an aspect associated with an environment of said dynamic function and providing a result; and within said chip, modifying an architecture of said dynamic function in accordance with said result.

The subject matter further discloses a method for modifying an architecture of a dynamic function embedded within a chip; the method comprising the steps of within said chip, challenging said chip; within said chip analyzing results of said challenging and providing analysis-results; and within said chip, modifying an architecture of said dynamic function in accordance with said analysis-results The subject matter further discloses a method for modifying an environment of an electronic entity; wherein said electronic entity having a connectivity with a chip; the method comprising the steps of: within said chip, challenging said electronic entity; within said chip, analyzing results of said challenging and providing analysis-results; and within said chip, modifying said environment of said electronic entity with accordance to said analysis-results. According to some embodiments said electronic entity being one member of a group consisting of a sensor and an A/D convertor.

The subject matter further discloses a security module; wherein said security module having a connectivity with an electronic entity for securing said electronic entity; wherein an architecture of said security module being changed according to an analysis of a security aspect of said security module; thereby securing said security modules by said security module. According to some embodiments said security module being one member of a group consisting of a Vault and a cryptology module.

According to some embodiments there is provided a method for modifying a connectivity between a dynamic function embedded in a chip and an electronic entity; the method comprising the steps of within said chip, challenging said connectivity; within said chip, analyzing results of said challenging and providing analysis-results; and within said chip, modifying said connectivity, in accordance with said analysis-results. According to some embodiments said dynamic function being an arbitrator. According to some embodiments said electronic entity being a peripheral. According to some embodiments there is provide d a method for generating a new dynamic function within said chip, wherein said chip comprises a plurality of a building blocks, a first function, and a specification defining said new dynamic function; the method comprising the steps of: within said chip challenging said specification and providing a new specification; within said chip, performing said first function in accordance with said new specification; and within said chip, generating said new dynamic function upon said performing said first function.

According to some embodiments there is provided a method, for generating a first dynamic function within a chip, said method comprising the steps of: generating a building block product by a dynamic function embedded in said chip; wherein said dynamic function comprises an at least one building block; and deactivating said dynamic function as a result of said generating; wherein said at least one building block are being available for generating a second dynamic function. According to some embodiments the method, further comprising the steps of utilizing said at least one building block for generating said second dynamic function.

According to some embodiments there is provided a electronic entity, said electronic entity comprising comprises a plurality of a building blocks, a first function, and a specification defining said new dynamic function; wherein said electronic entity being adapted for performing said first function in accordance with said specification and for generating a new dynamic function upon said performing said first function.

According to some embodiments there is provided a electronic entity said electronic entity comprising a dynamic function; said electronic entity being configured for challenging said dynamic function for providing challenging-results, for analyzing said challenging-results and providing analysis-results; and for modifying architecture of said dynamic function in accordance with said analysis-results.

According to some embodiments there is provided a electronic entity said electronic entity comprising a dynamic function; said electronic entity being configured for analyzing a security aspect associated with said dynamic function and providing a result, and for modifying an architecture of said dynamic function in accordance with said result.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

Figure 1:
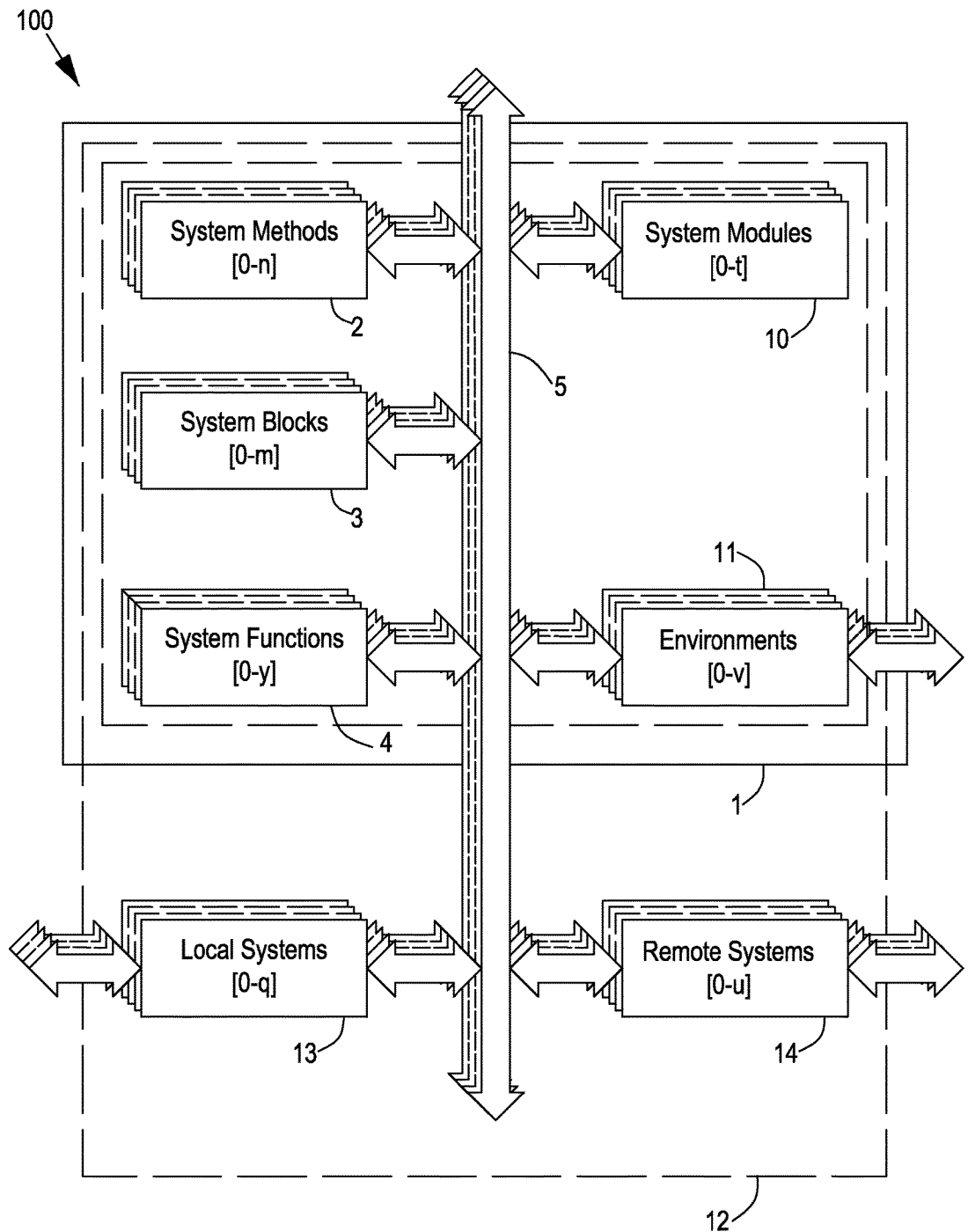
FIG. 1 shows a block diagram a system for generating an electronic entity and/or for modifying the architecture of an electronic entity, in accordance with some exemplary embodiments of the subject matter.

All the above and other characteristics and advantages of the invention will be further understood through the following illustrative and non-limitative description of preferred embodiments thereof.

DETAILED DESCRIPTION

The principles and operation of a method and an apparatus according to the present invention may be better understood with reference to the drawings and the accompanying description, it being understood that these drawings are given for illustrative purposes only and are not meant to be limiting.

The term control element refers herein to an element that controls software and/or hardware and/or mechanic and/or analog and/or mix signal operation and/or operations related to the environment. The control element can be analog and/or digital and/or a mixed signal. Examples of such control element are SoC (System on Chip), DSP (Digital Signal Processing), CPU and/or Smart MODEM, NoC (Network on a Chip), PSoC (Programmable SoC).

The term computerized device refers herein to any device controlled by a control element. The computerized device can be distributed, embedded, scalable, local and/or remote. The computerized device may be mobile, wearable, portable, planted and/or virtual. Examples of a computerized device are a server, a desktop, a laptop, a grid machine, head-mounted display (for example a glass), a contact lens display, a watch, a television, a printer, an industrial machine, a gaming console, a server, a cloud server, a modem, a cellular telephone or any type of a mobile and/or wearable and/or portable and/or desktop device.

The term electronic entity refers herein to one or more computerized devices and/or a network of computerized devices and/or one or more elements of a computerized device and/or one or more elements of an embedded device and/or one or more elements of an analog device and/or one or more elements of a digital devices. The elements may be hardware and/or software and/or mechanical and/or physical and/or environmental. An example of a physical element is a clock oscillator. An example of a mechanical element is MEMS. An example of an environmental element is a sensor or other element that measures the environment such as D/A converter. Examples of other elements are a software module, memory, a chip, silicon, co-software silicon, a circuit, a programmable gate, DSP, a power resource, a Power Management Integrated Circuit (PMIC), a Subscriber Identity Module (SIM) card and a circuit, a substrate, a metal and depletion. Examples of analog devices are a transistor, an amplifier and a power supply. The term electronic entity refers herein also to signals and/or logic structures. Examples of signals are transient, RF signals, optical signals, wired or wireless signals, current, voltage and temperature. Examples of logic and/or analog structures are software modules, transistors, a sequence builder and/or a scenario builder.

An electronic entity may be constructed from a plurality of electronic entities. For example a gate may be constructed from different types of transistors. The transistor may be built from a substrate, a metal layer and a depletion layer. The electronic entities which build another electronic entity are referred herein by the term building block which refers to an electronic entity from which another electronic entity is built The terms connectivity and or connection refers herein to wiring and/or routing and/or software linkage and/or protocols and/or wiring and/or signaling and/or event sequences and/or transmitting signals and/or data and/or receiving signals.

The term external environment refers herein to an environment that is external to the electronic entity. The external environment may be affected by other electronic entities, by one or more resources, by the internal environment, by the operation of the user and/or other persons which can be relevant to the environment. The external environment may be measured by measuring parameters such as parameters of a process of circuit. An example of a process is an assembly of silicon packaging, which can be trained and adapted in continuous, online, offline, local and/or remote according to the device and/or the environment. The measuring parameters may be physical, physiological, mechanical, logical, analog and/or digital. Examples of measuring parameters are temperature, frequency, humidity, proximity, pressure, noise, time, deviation of an image, inductance and impedance.

The term internal environment refers herein to an environment that is internal to the electronic entity. The internal environment may be affected by other electronic entities or affect other electronic entities. The internal environment may be affected by one or more resources, by the functionality of the electronic entity, behavior of the electronic entity, operation of controls of the electronic entity, any change in an architecture of an electronic entity, changes in memory of the electronic entity, operation of state machines, operation of the logic of the electronic entity, type of the electronic entity, architecture of the electronic entity, assembly of the electronic entity, operation of processes of the electronic entity, external environment, the structure of the electronic entity and/or by the operation of the user. The internal environment may be measured, predicted, differentiate, integrated, interpolated, extrapolated, processed, emulated and/or correlated by physical and/or logical parameters such as parameters of a process such as a circuit, voltage, temperature, frequency, current, power, inductance, impedance, behavioral source.

The term architecture of an electronic entity refers herein to the building blocks from which the electronic entity is built, the building block output-structure and/or input-structure and/or behavior and/or stimuli. The term behavior refers herein to electronic sequence and/or scenario. The electronic sequence includes a trigger for operating a function. The scenario includes functions and/or sequences. The electronic sequences and/or scenarios may be continuous and/or offline. The term architecture of an electronic entity refers also to connectivity between the building blocks from which the electronic entity is built and/or to the connectivity between the electronic entity and one or more other electronic entities. The term architecture of an electronic entity refers also to the operation of the electronic entity and/or to the functionality of the electronic entity and/or the external and/or internal environment of the electronic entity and/or building block. The operation refers herein to algorithm, protocols, mechanical rules and/or hardware rules and/or software rules.

The rules may be implemented by physical and/or physiologic and/or mechanical and/or hardware and or software; for example, command, constraint, behavior, specifications, guidance, structures, communications, algorithms, equations, protocols, functions and/or guidance.

The rules may be adaptive, correlated, predicted, dynamic, continuous, online, offline, autonomous, dependent, interactive, local and/or remote, scalable, independent, mitigate, and/or unique.

The rules may be built via unique and/or protected Artificial Intelligence and/or crowd wisdom and/or cognitive intelligence and/or digital signal processing and/or mechanical and/or software and/or hardware and/or equations and/or specifications and/or adapted and/or dynamic and/or correlated and/or interactive and/or non-interactive and/or predicted algorithm.

The architecture may also refer to the connectivity between the electronic entities to one or more other electronic entities. The architecture of the electronic entity may also refer to the status of the electronic entity and/or building block. An example of such a status is active or non-active.

The architecture may also refer to parameters of the electronic entity. The parameters may be physical, physiological, logical, hardware, software, mechanical, environmental (internal, external, local, and remote). The parameters may relate to variables and sizes. Examples of parameters are temperature, voltage, frequency, power, skew, glitch, jitter, noise, impedance, inductance, capacitance, amplitude, electromagnetic, parasitic, dissipation, proximity, acceleration, gyro, position, magnetic, parameters related to image, pressure, humidity, voice, gestures behavior, a pressure on a keyboard, a screen, a cap-sense, movement, language (body, voice), errors, behavior. Another example of parameter may be biometric data such as pulse, eye, finger, and voice and/or 3D/2D image.

The term specification refers herein to instructions for generating an electronic entity such as a dynamic function. The specification may include specification and/or constraints and/or rules and/or modes and/or equations. The specification may be implemented, for example, by functions and/or by a file or by structure or by architecture intelligent. They may be interactive or dynamic or static or a combination thereof. The specification may be unique to a device, adaptive and scalable. The specification may be used for generating dynamic functions. The specification may be generated by an electronic entity. The term dynamic function refers herein to an electronic entity that is dynamically and/or uniquely and/or autonomously and/or interactively and/or continuously built from building blocks according to a result of an analysis and/or according to the specification and which changes its architecture according to a result of an analysis. The term dynamic function may also refer to a single building block which changes is architecture according to the result of the analysis. Examples of dynamic functions are a processor, a VAULT and a memory controller The term decoy trapping refers herein to a method for detecting, an attempt to attack, and/or an attempt to cause a fault and/or and attempt to cause a misleading attack and/or an attempt to monitor and/or change and/or imitate and/or emulate an electronic entity. Such an attempt may be by, for example, reverse engineering and/or coping and/or distracting and/or faking and/or to paralyzing an operation of the electronic entity. The faking is for preventing a detection of the attack behavior and/or the attack structure.

With the extensive usage of electronic entities and the extensive usage of cloud computing, there is a need to improve the security and/or performance of the computerized devices and its internal and/or external environment.

Embodiments of the invention disclose an autonomous, scalable, interactive, non-interactive, offline, online, unique, local and/or remote system for dynamically and continuously generating and/or regenerating and electronic entity and/or modifying the architecture of an electronic entity according to a result of an analysis and/or according to the specification.

The term analysis refers herein to analysis of the operation of the electronic entities and analyzing the results of challenging the operation of the electronic entities. The analyzing may be done by one or more dynamic functions. The analyzing may be related to security aspects, performance aspects, usability aspects and maintainability aspects. The performance aspect includes resources constraint. The usability aspect includes the functionality of the electronic entity.

According to some embodiments the analysis is distributed among dynamic functions. According to some embodiments the result of the analysis is a summarizing of a plurality of individual results concluded by the dynamic functions.

According to some embodiments the analysis is changed according to the changes of the dynamic functions that perform the analysis and thus the results of the analysis are unique.

The analysis may use methods and/or tactics such as artificial intelligence, game theory, cognitive, majority votes, crowd wisdom, learning tactics and/or art of war tactics.

According to some embodiments the analysis may change the specification according to analysis result.

According to some embodiments the analysis is performed according to analysis input and according to an aspect of the analysis; refer herein interchangeably as an analysis criterion. The aspect of the analysis may be related, for example, to one or a combination of security of the electronic entity, resource constraint, performance, current and/or previous and/or predicted architecture, structure of the electronic entity, type of the electronic entity, functionality and/or behavior of the electronic entity, optimization of the functionality and/or structure and/or behavior of the electronic entity and/or quality assurance and/or production of the electronic entity. The analysis criterion may also be related to a recovery procedure of an electronic entity or building block to a previous and/or scalable and/or distributed architecture. The analysis criterion may also relate to the usability of the electronic entity.

The analysis input may also include parameters related to external and/or internal environment of the electronic entity and/or the building blocks.

The analysis input may also include output of previous analysis or predicted analysis. The analysis input may also include feedback from previous analysis or predicted analysis.

The term analysis input may also refer to the current, previous, future architecture of dynamic functions and/or the electronic entities.

The term analysis input may also refer to user behavior and/or to environment parameters.

Such analysis parameters may be frequency, temperatures, voltage, signal integrity, power, current, jitter, noise, glitch, skew, Signals behavior, protocols, models, constraints, equations, mixed signal, digital data, analog data, binary and/or hexadecimal and/or behavioral (for example, C, C++, Assembly, Perl, Shell scripts, Python, Ada, Verilog, VHDL, System Verilog, System C, IP-XACT, e, Basic, Pascal, Verilog AMS, VHDL AMS, Math Lab or any other programming language capabilities HW/SW) format, Image, Voice, Proximity, Humidity, Pressure, Direction, Accelerometer, Gyro, Compass, GPS, Wired, Wireless, bio sense, User behavior, Device behavior, Near and/or Far environment behavior for example third device and/or light, and/or space of the environment and/or resources.

According to some embodiments the analysis input may be changed according to a result of previous and/or current and/or predicted analysis.

According to some embodiments the criterion of the analysis may affect the analysis and the analysis result. For example if a criteria of performance of an electronic entity is used, the analysis may include attacking and analyzing the performance as a result of the attacking, the result may be to rebuilt the electronic entity for optimizing the performance in future attacking.

The analysis is performed continuously and/or sporadic. The analysis provides unique results since the analysis input is dynamically changed and since the analysis is performed by dynamic function which is dynamically changed according to result of analysis and according to changes in the environment. The analysis and result of the analysis are unique to the type and to the functionality of the electronic device and/or to the environment of the electronic device. Thus, each electronic device may react differently, uniquely and adaptively to the operation of the system.

According to some embodiments, the analysis, the criteria and the analysis input may change according to changes in the internal and/or external environment and according to changes in the architecture of the electronic entity and or according to user behavior.

According to some embodiments the dynamically generation and/or regeneration and/or change of the architecture of an electronic entity and/or the generating of the electronic entity may be performed by replacing a building block of a first electronic entity with a second building block. In some embodiments the replacing include disconnected from a second electronic entity and connecting to the first electronic entity. According to some embodiments the second electronic entity is a non active electronic entity or an electronic entity that can be deactivated without or with minimum change to security or performance of the whole system.

According to some embodiments the other building block performs the same or similar functionality. According to some other embodiments the other building block performs different functionality. In such a case the electronic entity may change its functionality as a result of the replacing of the building blocks.

When replacing to another building block with the same functionality the building block is replaced with another building block of the same type; for example, a building block of a DC to DC convertor of one vendor may be replaced with a building block of a DC to DC convertor of a different vendor. In some other cases the building block is replaced with a building block of a different type but similar functionality; for example, a building block of a DC to DC convertor may be replaced with LDO.

In another example a flip flop replaces gates and vice versa. The replaced building block may be used for rebuilding another electronic entity. According to some embodiments, when a first building block is replaced with a second building block, the first building block is powered by power resources and/or stimulated. Such a powered building block can be instantly used and can also be validated by analysis. The replacing may be by modifying the connectivity between the building blocks and by activating and/or deactivating building blocks. Activating and/or Deactivating building blocks may be done according to the analysis and/or according to the spec.

According to some embodiments the dynamically generation and/or regeneration and/or change of the architecture and/or the generating of the electronic entity may be performed by modifying the connectivity between building blocks and between dynamic functions; for example, by connecting a first building block with a second building block or by disconnecting a building block.

According to some embodiments the dynamically generation and/or the regeneration of the architecture and/or the generating of the electronic entity may be performed by modifying the functionality and/or behavior of the dynamic functions. An example of behavioral change is a custom compression. An example of operational change is a performance improvement.

According to some embodiments the dynamically generation and/or regeneration of the architecture and/or the generating of the electronic entity may be performed by modifying the connectivity between an electronic entity that is handled by the system and the system, by modifying the connectivity between the electronic entity that is handled by the system and/or other electronic entities that are or are not handled by the system. For example, a staggered matrix ball may be built by the system and may be embedded as a matrix layer of an application CPU.

According to some embodiments the dynamically generation and/or regeneration of the architecture and/or the generating of the electronic entity may be performed by modifying external and/or internal parameters and/or response of the electronic entity.

According to some embodiments the dynamically generation and/or regeneration of the architecture and/or the generating of the electronic entity may be performed by adding and/or subtracting and/or duplicating and/or transforming and/or reforming and/or moving and/or modifying and/or destructing and/or constructing and/or reconstructing a building block of an electronic entity.

According to some embodiments the dynamically generation and/or regeneration of the architecture and/or the generating of the electronic entity may be performed by connecting a building block with another building block.

According to some embodiments the dynamically generation and/or regeneration of the architecture and/or the generating of the electronic entity may be performed by modifying an internal or external environment of the electronic entity or a building block of the electronic entity.

According to some embodiments the dynamically generation and/or regeneration of the architecture and/or the generating of the electronic entity may be performed by modifying the mode of work and or the functionality of the building block. For example, if a building block functionality of creating flip-flops is changed to creating latches. The new functionality may change the dynamic functions. The new functionality may also change the building block behavior. In another example, a synchronous building block is changed to an asynchronous building block and thus changes its behavior.

According to some embodiments the dynamically generation and/or regeneration of the architecture and/or the generating of the electronic entity may be performed by activating and/or deactivating building blocks of the electronic entity.

According to some embodiments the dynamically generation and/or regeneration of the architecture and/or the generating of the electronic entity may be performed by removing building blocks of the electronic entity; wherein the removing comprising modifying connectivity of building blocks and making the building blocks available for other electronic entities.

In one example, an analysis of a sensor affects the operation of a display. For example, a proximity sensor may sense the proximity of the user to the cellular telephone. The analysis may conclude, based on usability criteria that the user does not see the display well and has to hold the cellular device closer to his eyes. Thus the analysis may decide to increase the light of the display.

In one other example the analysis may detect that the user operates a camera and may conclude to disable the operation of the camera and a microphone.

A system-method is a dynamic function performing one or more functionalities. Each system-method may be autonomous and/or independent from other methods. The system-methods are explained in greater details in FIG. 2.

The system-function is built of one or more system-methods. According to some embodiments, the system function the architecture of the dynamic function is contagiously changed according to results of an analysis. A system function is defined by the methods included in the system function, the connectivity between the methods, input and/or output and/or by environment parameters; the input may include signals and/or digital data. The system function performs the functionality of the system methods. Examples of system-functions are state machines and/or logics. The system-functions may build/rebuild dynamic functions and/or connections according to a result of one or more analyses and/or according to the spec. The functions are dynamically generated and/or regenerated according to a result of one or more analyses and/or according to the spec. Each function may be autonomous and/or independent from its creator. The system-modules are built from system-functions. According to some embodiments system-functions and the system-modules provide additional system-functionality. For example the system modules and/or system function may provide additional security and/or performance and/or reliability and/or functionality. Examples of such modules may be Vault, a cryptography module and/or memory controller and/or signal generator and/or analysis module. Other examples are the measurement, research and development tools and tools used by the analyses.

The system modules may be autonomous and/or independent and/or unique and/or scalable from/with each other.

In some embodiments the tools that are used by the analysis are built from system modules and system functions.

According to some embodiments the system may be connected to electronic entities. In some embodiments the connecting is for securing the electronic entities and/or for improving the performance and/or for recovering and/or for track changes and/or for mitigating and/or optimization of the electronic entity structure and/or behavior and/or redundancy and/or reliability behavior of the electronic entity. For example the system-modules may be connected to I/O of the cellular device, to sensors of the cellular device, to resources of the cellular device, to the power supply of the cellular device and/or controls of the cellular device. Examples of such controls are clock, power, reset and soft error. The connection may be done according to a dynamic and/or custom and/or standard and/or unique and/or adaptive and/or generic reference design. According to some embodiments the system may be externally connected to the electronic entity. According to some other embodiments, the system may be embedded in the electronic entity, for example embedded in a System on a Chip, Application Specific Standard Product, System on Programmable Chip, Digital Signal Processing, Network on a Chip, Solid State Memories, Security Chips (Trusted Platform Module).

In one example a soft or hard error in an electronic entity is detected by the analysis and/or according to the spec. A soft error is an error that does not damage the circuit, but changes the state of the circuit, while a hard error damages the circuit. In such a case the result of the analysis may be to replace a building block of the electronic entity with a second building block of a second electronic entity that is currently not active, taking into consideration other criterion such as performance and security. Another result may be modifying the building blocks, for example modifying a tunnel of a transistor or injecting a signal.

The system may monitor and control the operation of the electronic entity via such connections. The monitoring may be for learning the behavior of the electronic entity. In some cases the monitoring is for detecting a risk and/or a performance and/or a resource and/or an environment problem. The controlling may be, for example, for modifying the external environment and/or for switching to a redundant and/or adaptive and/or added and/or different power supply as a result of the result of one or more algorithms. In another example the system activates or deactivates sensors as a result of a result of the algorithm. The algorithm may conclude that a sensor does not function or is under attack or is not secured and thus may conclude that the sensor has to be deactivated and that another sensor has to be activated instead.

According to some embodiments the system may provide additional and/or different functionality to the electronic entity connected to the system. An example for such additional functionality is cryptology. Another example is random number selection and/or generation.

When externally connected to the electronic entity, the system may emulate the internal environment of the electronic entity and may cross-correlate between the emulated behavior and the real behavior. Such correlation may be for identifying a risk or changes in performance and/or resource management.

In some cases the building blocks and/or the building block products communicate with dynamic functions of another system. In some cases the communication may be for the analysis and for providing the result of the analysis.

The dynamic functions may be embodied in circuitry, an integrated circuit, a hybrid circuit, a system on chip or in a hybrid/mixed with SW or in SW. The dynamic functions may be incorporated in the controller. Examples of such circuitry are ASIC, FPGA. For example mobile platforms such as System on a Chip with single and/or multi cores symmetric and/or asymmetric dynamic and/or discrete architectures. The system can also be embedded in a standard application System on a Chip, platforms, Application Specific Standard product, PMIC (Power Management Integrated Circuit), Memories, Integrated Circuits, Mixed signal devices like analog to digital, digital to analog converters or Network on a Chip in order provide more secure performance, resource optimization and reliability in-terms of security, production, performance and other capabilities.

According to some embodiments, dynamic functions and/or the building blocks can be built and/or removed and or activated and/or deactivated according to a result of the analysis and/or according to the spec. For example, a first system-function that has been generated or regenerated by a second system-function may remove the second system-function. According to some embodiments the dynamic functions may change location on a circuitry. Modifying a location may be done, for example, by inheriting and/or generating an instance of a first building block function in another location and then deleting the first instance of a dynamic function and/or the building block itself. According to some embodiments when a dynamic function is removed the building blocks of this dynamic function can be used for modifying architecture of another dynamic function or for building a new dynamic function and/or a different or the same dynamic function.

In some other cases the internal or external environment of the electronic entity is changed according to analysis results and/or according to the spec. For example, a temperature may be changed. In some other cases one or more parameters, constraints, behavior, structure of the electronic entity is changed according to analysis results and/or according to the spec. For example, a clock or access time may be changed.

According to some embodiments the specification may be changed according to a result of the analysis and/or according to the spec.

According to some embodiments the dynamic functions vote and/or contribute for providing a result of the analysis and/or according to the spec.

One technical problem dealt with the disclosed subject matter is to minimize the risk of Differential Power Analyses (DPA). Integrated circuits are built out of individual transistors, which act as voltage control switches. Current flow along the transistor delivers charge to other transistors. The motion of electric charge consumes power and produces electromagnetic radiation, both of which may be detectable. Thus, it is easy to identify microprocessors, bus transaction, communication, algorithm, logical (SW and/or HW), tamper protection switches, analog activity by monitoring the power consumption. Minimizing the risk of DPA is typically performed by running dummy code. However, such a solution reduces the performance of the microprocessor. Such a solution does not relate to the internal and/or external environment and/or resources and/or system functionality modes. Such a solution is also predictable and may be detectable by a DPA attacker by, for example, detecting a change in a performance of the microprocessor, PMIC, algorithm, memory, bus transaction, communication and/or resources.

One other technical problem is to provide directive secured decoy trapping. Such decoy trapping has to be protected and unique. The decoy trapping should not be bypassed or learned and/or used in another device. The decoy trapping has to be an autonomous, scalable and adaptable for all modes and environments One other technical problem dealt with by the disclosed subject matter is reverse engineering. Attackers typically perform reverse engineering in order to identify the hardware and the software in order to copy, fake, learn and or disrupt an operation of electronic entity.

One other technical problem dealt with by the disclosed subject matter is to perform automated testing of an electronic entity.

One other technical problem dealt with by the disclosed subject matter is automated production of an electronic entity.

One other technical problem dealt with by the disclosed subject matter is automated quality assurance of an electronic entity.

One other technical problem dealt with by the disclosed subject matter is automated optimization assurance of an electronic entity One other technical problem is the insecurity of the security module, such as Vault and/or tampering mechanisms. The security module may also be attacked or may fail, thus leading to a security problem in the electronic entity that is secured by the security components.

One other technical problem dealt with by the disclosed subject matter is the need for automating the fixing of the hard errors in the chip.

One other technical problem dealt with by the disclosed subject matter is the need to take into consideration security, performance and resource constraints when fixing soft and hard errors in a chip.

One other technical problem dealt with by the disclosed subject matter is reliability of the electronic entity.

One other technical problem dealt with by the disclosed subject matter is prolonging life of the electronic entity.

One technical solution is to dynamically and uniquely to the device and to the environment modifying the architecture of electronic entities according to a result of the analysis and/or according to the spec; wherein the analysis and the result of the analysis may be distributed among one or more of the dynamic functions, such that if one building block or dynamic function fails the system keeps working. In some cases the dynamic functions are the security modules such as Vault; in such a case the dynamically rebuilding of the security modules provide security and/or performance to the security modules. In some embodiments the result of the analysis may be taken by module or function autonomously. In some embodiments the specification is changed according to ma result of the analysis.

One other technical solution is dynamically and/or adaptively and/or uniquely applied to the device and to the environment replacing a resource according to a result of the analysis; wherein the analysis is performed by a dynamic function; wherein the dynamic functions are dynamically, adaptively, uniquely changed, generated, re-generated according to the result of the analysis wherein connections between the resources and/or the dynamic functions are dynamically, adaptively, changed, generated according to a result of the analyses and wherein the analysis and the result of the analysis is distributed among one or more dynamic functions and/or building blocks.

One other technical solution is disconnecting a generator dynamic function from the building block that was generated by the generator and deactivating the generator for avoiding reverse engineering.

Examples of such resources are power supplies, powers management, power grids, power topologies, methodologies and/or I/O's.

One other technical problem is the anti-tampering protection mechanism. Such a mechanism is typically not protected.

One technical solution is disconnecting the constructor of the anti-tampering mechanism after the constructor has built the anti-tampering mechanism. The disconnecting may be implemented by a fuse or one time programmable. One other technical solution is deactivating the constructor and using the building blocks for building other dynamic functions. The deactivating eliminates the reverse engineering of the constructor. The disconnecting eliminates the effect of an attack of the anti-tampering mechanism.

One other technical problem is protecting the physical data repository and/or its content. Such physical data repository may be memory, hard disk and the like. The address map and the data repository structure are typically static. The virtual memory (Memory Management Unit) allocates virtual, logical addresses, however the absolute (physical) address map does not change and the logical address cannot be correlated nor adapted to structure, resources, environment, needs and/or behavior. The memory access (read, write) of the memory controller is deterministic. The on board and off board data repositories are typically protected by physical tampers which are deterministic and, thus, not secure enough since the attacker can still hook the physical address.

One other technical solution is providing a non-continuous data repository by adaptively, dynamically, uniquely partitioning the physical data and/or address repository into partitions of a plurality of vendors, processes, techniques, functions or different devices and/or blocks from the same vendor/process/techniques/functions or a combination thereof; by providing, a unique dynamic arbiter that dynamically, adaptively changes the physical I/O's and, thus, provides dynamic, adaptive address map, memory structure of mixing internal/external memory and/or memory methods. Examples of such vendors are Samsung, Micron and TSMC.

One other technical problem is a trade-off between security and performance.

One other technical solution is a dynamic function for adaptive and/or unique and/or secured compression algorithm which can be correlated to resources, environment and/or requirements. The compression algorithm may compress the data and/or address and/or adaptive, session and/or scramble. The compression algorithm is changed according to changes in the environment, resources, performance and/or risk.

FIG. 1 shows a block diagram of a system for securing an electronic entity, in accordance with some exemplary embodiments of the subject matter. System 100 includes system-methods 2, building blocks 3, system-functions 4, system-modules 10 and environments 11. System-methods 2, the building blocks 3, system-functions 4, system-modules 10 and environments 11 are connected with a set of matrixes 5. Matrixes 5 may be software and/or hardware implemented. Matrixes 5 can be software matrix and/or a hardware matrix. Matrixes 5 may be software and/or hardware implemented. Matrixes 5 may be built and/or rebuilt according to the results of analyses. Matrixes 5 may be scalable.

The building blocks 3 may be analyzed other system-methods 2 and/or system-functions 4 and/or system modules 10 and/or building blocks 3 of the system 100. The building blocks 3 may be analyzed by building blocks or system methods or system functions of local systems 13 and remote system 14 for providing the analysis result and for providing the spec. The analysis result may be used for deactivating or activating or removing the building block 3 or generating or modifying the architecture of the building block 3.

The system modules 10 may be analyzed by other system-methods 2 and/or system-functions 4 and/or system modules 10 and/or building blocks 3 of the system 100. The system modules 10 may be analyzed by building blocks or system methods or system functions of local systems 13 and remote system 14 for providing the analysis result and for providing the spec. The analysis result may be used for deactivating or activating or removing the system modules 10 or generating or modifying the architecture of the system modules 10.

The system methods 2 may be analyzed by other system-methods 2 and/or system-functions 4 and/or system modules 10 and/or building blocks 3 of the system 100. The system methods 2 may be analyzed by building blocks and/or system-functions and/or system-modules or of local systems 13 and remote system 14 for providing the analysis result and for providing the spec. The analysis result may be used for deactivating or activating or removing the system method 2 or generating the system method 2 or modifying the architecture of the system method 2.

The system-functions 4 may be analyzed other system-methods 2 and/or system-functions 4 and/or system modules 10 and/or building blocks 3 of the system 100. The system-functions 4 may be analyzed by building blocks or system methods or system functions of local systems 13 and remote system 14 for providing the analysis result and for providing the spec. The analysis result may be used for deactivating or activating or removing the system functions 4 or generating or modifying the architecture of the system functions 4.

Examples of system functions are state machines, control units, interfaces, and/or algorithms, compression functions, errors functions and statics function.

The Vault is a system module that holds, manages, adaptive, dynamic, unique keys for accessing memory or any other storage. The keys are, for encrypting or for decrypting data, address regions, structures, system functions, recovery functions, the analysis, the constraints, and performance data.

In some embodiments the Vault is implemented as state machine and/or logic such that the keys are not saved and/or manage in a static memory (internal, external, volatile, non-volatile). Thus, any attempt to recover the keys via the DPA, Memory reverse engineering, logic retention, FIB (Focused Ion Beam), Bypass, Cut, Side channel attacks, Man in a middle attacks, crypt analysis attacks communication attacks, reverse engineer is not effective.

Implementing the vault as a system function provides a more secured Vault.

The system function 4 may include master/slave relationships which cannot be emulated, learned, duplicated and/or patched.

The environment 11 may be the internal and/or the external environment.

The local system 14 includes an at least one system for protecting another electronic entity of the same device. For example a system for protecting an antenna of a cellular device may be connected to a system for protecting a SIM card on the same cellular device.

The remote system 15 includes an at least one system for protecting another electronic entity of another device. For example a system for protecting an antenna of a cellular device may be connected to a system for protecting an antenna of another cellular device.

The majority vote 12 may be a system method. The majority vote 12 provides a result of the analysis according to a majority vote of the system methods and/or system functions and/or building blocks. The functionality majority vote 12 may be changed according to a result of the analysis. The majority vote 12 may change or deactivate or remove the specification according to a result of the analysis.

Figure 2:
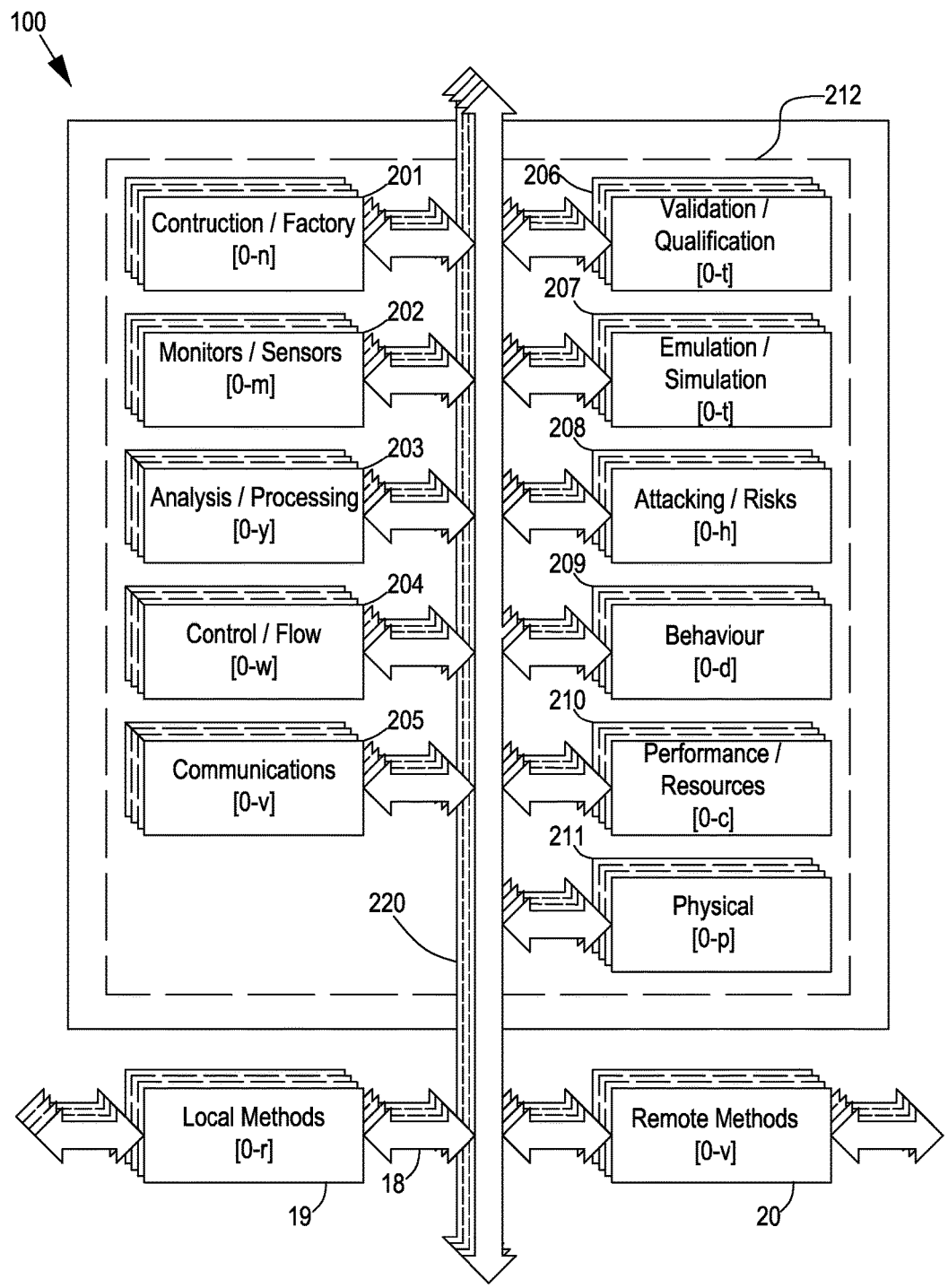
FIG. 2 shows a block diagram of system methods, in accordance with some exemplary embodiments of the subject matter.

FIG. 2 is a block diagram of system-methods, in accordance with some exemplary embodiments of the subject matter. System methods 2 include (costrution/factory) implementer 201, (monitors/sensors) measurement 202, analysis 203, control 204, communication 205, proofer 206, Emulation/Simulation 207, Attacking 208, behavior 209, performance 210 majority vote 212 and physical layer 211.

The implementer system methods 201 are adapted for generating electronic entities for modifying the architecture of the electronic. The generation and the modifying of the architecture are performed according to specification and/or analysis and/or according to a specification and/or according to available resources. For example, if the specification instructs to connect a first building block with a second building block and the analysis concludes that such a connection may decrease the performance, a second analysis may be done for choosing a third building block which has a similar functionality to the second building block. In another case, the analysis may conclude that the specification has to be replaced. The implementer system methods 201 may include statistics, history, prediction, artificial intelligence, game theory, crowd wisdom, validation and/or emulation methods, correlation, environment and/or performance methods.

In another example the specification may instruct to choose a specific type of a building block and there is a plurality of available building blocks of this type, the analysis may conclude which building block to choose according to security criterion, for example.

Measurement system methods 202 are adapted for measuring the sensors and/or for monitoring the system.

The analysis system methods 203 are adapted for processing the analysis. The processing may be continuous or only during validation. The processing may include cryptology, statistics, prediction emulation, simulation, performance, correlation between results of simulation and results of continuous, authentication, validation, compression, risk analysis and risk assessment. The processing may be performed by cognitive analysis artificial intelligence (AI), game theory and/or crowd wisdom. The processing is authenticated, thus providing a secured and unique solution.

The control system-methods 204 are adapted for controlling and/or qualifying the implementer system-methods 201 and/or one or more other system-methods, according to result of the analysis and/or according to a spec.

The communication system-methods 205 are adapted for providing communication between system-methods, system-functions and system-modules.

The proofer system methods 206 are adapted for validating and/or qualifying the generated or rebuilt architecture of the system-methods, system-functions, system-modules and other electronic entities. The validation may include dynamic, adaptive, scalable, unique validation-environment. The validation-environment may include unique sequencers, sequences, prediction, monitors, coverage plan, validation plan, metrics evaluations and assertions.

The Emulation/Simulation 207 system methods are adapted for emulating the system methods, system-functions, system-modules and other electronic entities after the rebuilding and before/during/after the activating. The Emulation/Simulation 207 system methods may attack the dynamic function and/or evaluate the performance, before/during and/or after activating of the dynamic function.

The Attacking system methods 208 are adapted for attacking a system-modules or a system function or a building block or a system method or any electronic entity. The attacking may be continuous or only during validation. The Attacking system-methods 208 may implement pen testing, FIB, side channel attacks DoS, bypass, reverse engineering, DPA, environment difference/anomaly, errors, mal functions, APT (Advanced Persistent Threat), X-Ray.

The behavior system methods 209 are adapted for providing errors in one or more building blocks, system-modules, system-methods, system-functions and other electronic entities. In some cases the error is for securing. In some cases the error is for decoy trapping. For example, an error can be inserted into the data and can be fixed at a later time. In such a case the error may also improve a compression rate. The behavior system-methods may simulate/emulate the building blocks, system-modules, system-methods, system-functions and other electronic entities for securing purposes and for learning purposes. The behavior system methods 209 may also include digital and/or analog random/constraint (random) generators, which are adapted to the internal/external environment and to the electronic entity. According to some embodiments the random number is generated by a plurality of random generators wherein the random generators are chosen according to results of the algorithm. The random generators are authenticated and may be self-attacked by the system.

The performance system methods 210 are adapted for checking performance of building blocks, system methods system-functions system modules and other electronic entities.

The physical layer 211 includes analog and digital components. Such analog and digital components may be protected unique ND, D/A, resistors, amplifiers, capacitors, modulators, de-modulators, current resources, voltage resources, clocks generators and more.

The majority vote system methods 212 are adapted for voting. The voting is for providing a result of the analysis and/or for modifying and/or deleting and/or deactivating a spec. According to some embodiments each method is assigned with a weight of a vote and the result is a summation of the vote taking into consideration the weight of the vote of each module.

The local methods 19, connected by local methods matrix 18, include at least one method for protecting another electronic entity of the same device.

The remote methods 20 include an at least one methods for protecting another electronic entity of another device.

Figure 3:
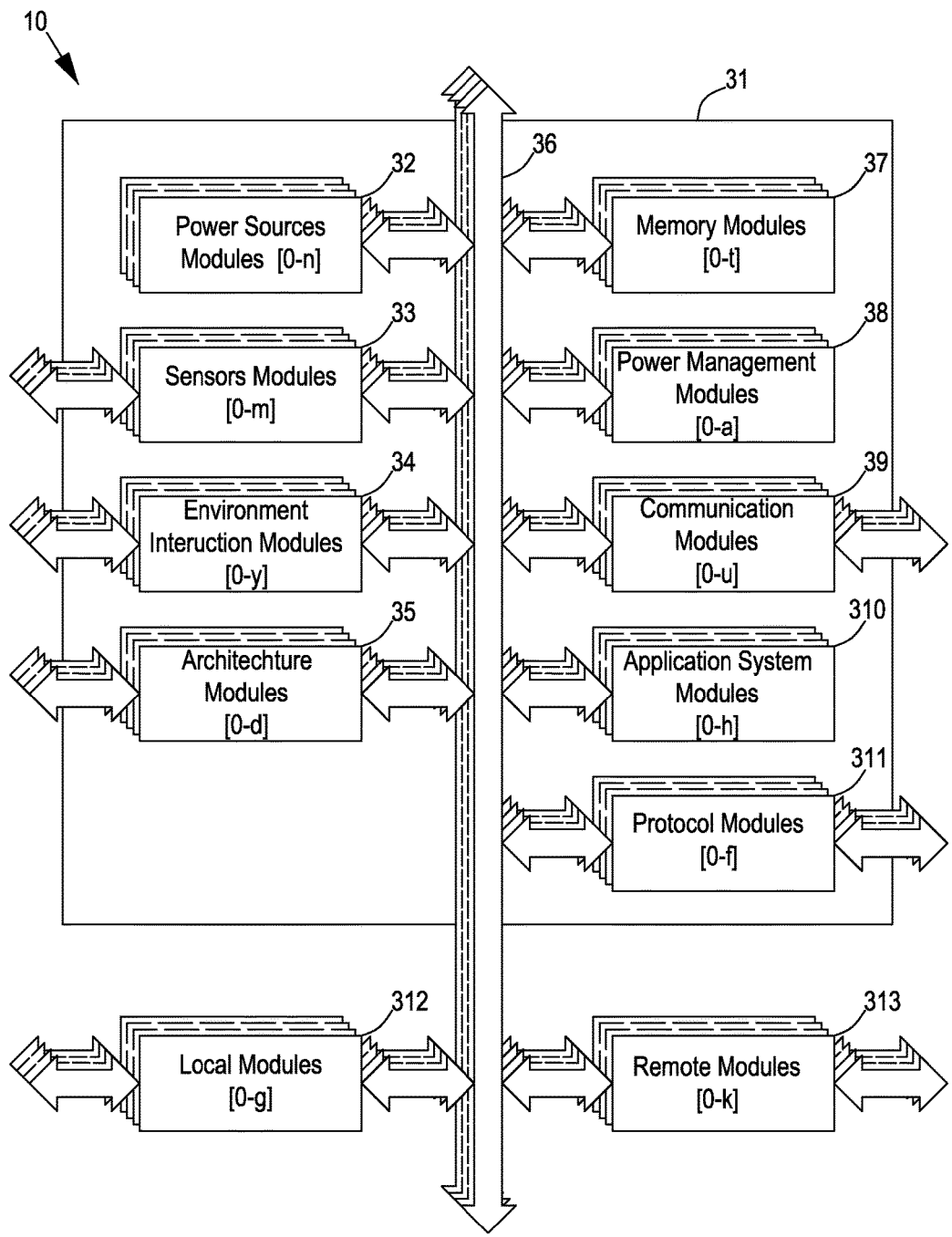
FIG. 3 shows a block diagram of system-modules, in accordance with some exemplary embodiments of the subject matter.

FIG. 3 shows a block diagram of system-modules, in accordance with some exemplary embodiments of the subject matter. The system-modules 10 include a power sources system-module 32, a sensor system-module 33, an interactive environment system-module 34, an architecture system-module 35, a memory system-module 37, a power management system-module 38, a communication system-module 39, an application system-module 310 and a protocol system-module 311.

The power sources system-module 32 controls and manages one or more power sources. Examples of such power resources are a battery, a capacitor, a coil and/or a solar cell, a chip battery. The power sources can be dependent or independent (for example, primary battery and dependent and/or secondary and/or auxiliary battery). The power source system-module 32 provides secured switching between the power sources according to a result of the analysis.

The sensor system-module 33 manages and controls sensors of the electronic entity. For example, the electronic entity may be a smart-phone and the sensors may include a camera and/or a proximity sensor. In some cases one or more extra sensors are added to the electronic entity for securing the electronic entity. In such cases the sensor system-module 33 manages and controls the extra sensors. The sensor system-module 33 is adapted for analyzing the input from the sensors. The analysis of the input is used by the analysis is for identifying a threat. Such a threat may be person that is viewing a display of an operating device, or any attack. For example the sensor system-module 33 may analyze the results from the camera, from the proximity sensor and from the temperature sensor for providing an indication about an unexpected object or person. Such analysis may be performed by associating a weight for each sensor output. In some embodiments the weight is changed according to a result of the analysis. Such analysis provides more reliable results then an analysis of a single sensor. Such analysis can overcome a faulty sensor by excluding the output of the faulty sensor and reassigning weights to the other sensors. The sensor system module 33 may detect a risk by sensing a change in the external and/or internal environment.

An example of an attack is an attempt to pour liquid Nitrogen on a chip in order to copy the content of the chip; another example is an attempt to overheat the chip. The sensor system-module 33 is also adapted for increasing the reliability of the output of the sensors by measuring results from a plurality of sensors of the same/different type in a plurality of locations; thus measuring in different/same locations and also measuring the deferential/integral results between the pluralities of sensors. For example, four temperature sensors may be inserted in four corners of a CPU, enabling the measuring of the temperature in the four corners of the CPU and enabling the measuring of the temperature of each sensor relative to the other sensors; such a comparing increase the reliability of the results.

The sensor system-module 33 is adapted for authenticating the sensors. The authenticating is for detecting DPA and/or attempts to avoid an operation of a sensor or to fake an operation of a sensor. The authentication is performed by analyzing a differential/integral and/or a rate of a deferential related to sensors of the same/other type, a deferential/integral and/or a rate of a deferential related to the environment of the sensor, a deferential/integral and/or a rate of a deferential related to functionality of the electronic entity associated with the sensor, a deferential/integral and/or a rate of a deferential related to architecture of the electronic entity associated with the sensor and any combination thereof. Since the functionality and/or the architecture of the electronic entity are changed, the authentication is not predicted.

The sensors of the same type may be on the same electronic entity, on another electronic entity or a combination thereof.

The calculating of the deferential/integral between sensors includes calculating a predefined deferential/integral and/or a run time (continuous) deferential between the outputs of the sensors, and calculating a third deferential/integral from predefined deferential/integral and the runtime deferential/integral. A possibility of a threat is determined if the third differential/integral exceeds a threshold and or anomaly behavior. The threshold is dynamically changed according to parameters such as predicted threat. The pre-defined deferential/integral is determined by measuring the differential/integral of the outputs of the sensors at steady state. The threshold is dynamically changed according to parameters such as predicted threat.

The calculating of the differential/integral related to the environment includes calculating a run time and/or offline deferential/integral between the internal/external sensor and/or environmental sensor and/or calculating a third deferential/integral from a predefined deferential/integral and the runtime/offline deferential/integral. The internal/external sensor is a sensor that is associated with an electronic entity; an environmental sensor is a sensor that is associated with an environment of the electronic entity. A possibility of a threat may determine if the third differential/integral exceeds a threshold and/or behavioral anomaly. The pre-defined deferential/integral is determined by measuring the differential/integral between the internal/external sensor and/or the environmental sensor when the electronic entity is in idle state. The threshold is dynamically changed according to parameters such as predicted threat. The threshold is dynamically changed according to parameters such as predicted threat.

The calculating of the deferential/integral related to functionality of the electronic entity includes calculating a run time and/or offline deferential/integral between the outputs/inputs of the sensors, calculating a third deferential/integral from a predefined deferential/integral and/or the runtime/offline deferential/integral. A threat may determine if the third differential exceeds a threshold and/or behavior anomaly by interacting/investigating the behavior of the sensor. The pre-defined deferential/integral is determined by measuring the differential/integral of the inputs/outputs of the sensors at steady state. The threshold is dynamically changed according to parameters such as predicted threat.

The calculating of the deferential/integral related to architecture of the electronic entity may include calculating a run time/offline deferential/integral between the inputs/outputs of the sensors, calculating a third deferential/integral from a predefined deferential/integral and/or the runtime/offline deferential/integral. A possibility of a threat is determined if the third differential/integral or more exceeds a threshold and/or behavioral anomaly. The pre-defined deferential/integral may determine by measuring the differential/integral of the inputs/outputs of the sensors at steady state. The threshold is dynamically changed according to parameters such as predicted threat.

The application system system-module 310 controls the I/O of the control elements of the standard application system of the electronic entity. The I/O of the control element includes power control, frequency, temperature and/or power control. The controlling may include locking an access to the control element. The locking may be performed by, for example, disabling the clock. The locking is performed when the system identifies a threat. The controlling may also include modifying the I/O.

The interactive environment system-module 34 is configured for providing trusted environment between pluralities of electronic entities. For example, two or more electronic entities may transfer data to each other.

The architecture system-module 35 is adapted for generating the architecture of each system-module according to the result of the analysis and/or according to a spec.

The memory system-module 37 comprises an unique dynamic arbitrator that dynamically changes the physical I/O. The physical I/O is connection to physical data repository that is partitioned into of a plurality of vendors or different devices from the same/different vendor or a combination thereof. The change to the physical I/O is performed according to results of the analysis and/or according to a spec.

The dynamic arbitrator is connected to a memory controller in case off chip and to the bus in case of on chip memory. The memory system-module 37 also dynamically changes a connection between CPU and/or any other peripheral and the MMU by the by dynamically modifying the bus matrix layer. The changes are according to result of the analysis and/or according to a spec.

The memory system-module 37 may also include unique and/or protected compression and/or error correction in order to provide a better correlated security and/or performance. The compression and/or error correction may be implemented natively within the memory system-module 37. Examples of memory system-module 37 are memory controller, arbiter, memory address decoder, I/O, address bus and data bus.

The power management system-module 38 uniquely protects, controls and/or manages power supplies associated with an electronic entity. Examples of such power supplies are DC to DC, LDO (low-dropout). The power management system-module 38 may provide secured switching between the power supplies by dynamically and/or uniquely selecting a power supply from the redundant and/or demanded power supplies according to results of the analysis and/or according to a spec.

The communication system-module 39 is adapted for securing a communication between pluralities of electronic entities.

The application system module 310 rebuilds the control elements according to results of the analysis and/or according to a spec.

The protocol module 311 is configured for providing the protocols between electronic entities. The protocol may be changed/generated according to a result of the algorithm.

The reference design 31 is configured for connection between the system modules and the electronic entities that are controlled by the system modules.

The system-modules are connected by a secured and unique matrix 36. The matrix 36 can be software matrix and/or a hardware matrix. The matrix 36 can be software matrix and/or a hardware matrix. The matrixes 36 may be software and/or hardware implemented. The matrixes 36 may be built and/or rebuilt according to a result of analysis. The matrixes 36 may be scalable.

The system-modules may be connected to other system-modules in the same electronic entity (local system-modules 312) and the system-modules from another electronic entity (remote system-modules 313).

Figure 4:
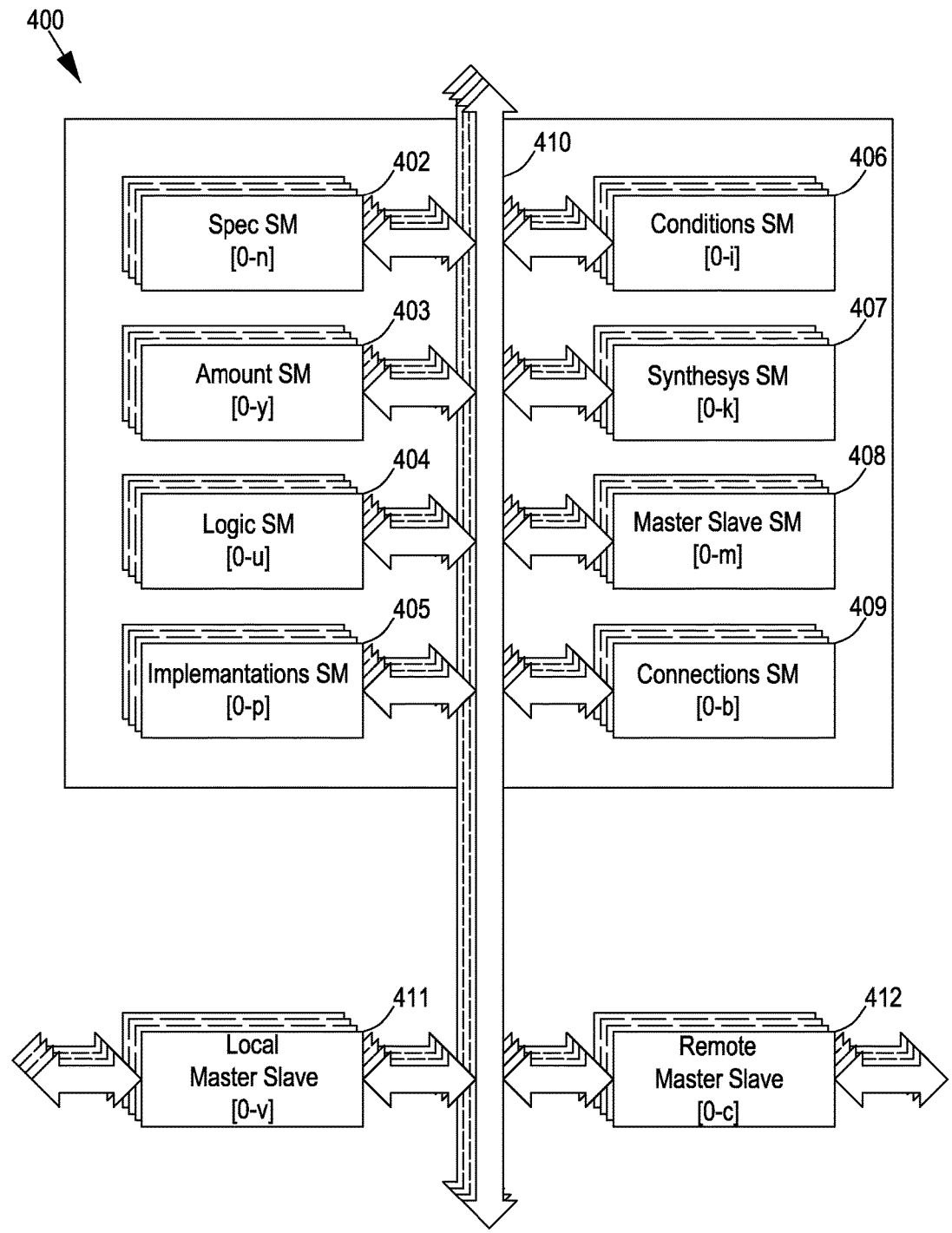
FIG. 4 shows a block diagram of State Machines, in accordance with some exemplary embodiments of the subject matter.

FIG. 4 shows a block diagram of State Machines, in accordance with some exemplary embodiments of the subject matter. According to some embodiments the state machine may be a Finite State Machines (FSM). The state machines are functions. The state machines may generate the system methods. At initialization a genesis state machines and genesis system-methods may be supported or may be built according to a specification and/or constraint and or another device. In some embodiments the genesis state machines and/or genesis system-methods may not be secured. The genesis state machines may build other state machines/modules/methods/functions according to analysis result and/or according to a spec. The genesis state machines and system-modules may be destroyed after the generating.

The state machines may change/generate functionality according to a result of the algorithm thus, confusing an attacker, improving security, performance, optimization, architecture, resource sharing, integration and/or scalability.

Referring now to the drawing: system state machines 400 may include a specification State Machine 402, an amount State Machine 403, a logic State Machine 404, an implementation state machine 405, a condition state machine 406, a synthesis state machine 407, a master slave state machine 408 and a connection state machine 409.

The specification State Machine 402 is configured for defining the architecture of the state machines according to parameters such as type of the circuits (memory), type of state machine, the logic per each state, the goal of the state machine (Master or Slave) the connectivity, power, clock, controls, placement, environment correlation and the like. In some embodiments the specification includes a file. In some embodiments the specification is dynamically, adaptively, uniquely changed according to result of the analysis and/or according to a spec.

The amount state machine 403 is configured for defining the amount of states in a state machine.

The logic state machine 404 is configured for defining conditions for transition from one state to the other. A transition is a set of actions to be executed when a condition is fulfilled or when an event is received.

The implementation state machine 405 is configure for choosing, from a stock of dynamic functions, the actual dynamic function according to requirements of the specification state machine 402.

The condition state machine 406 is configured for defining conditions for transition from one state to another state.

The synthesis state machine 407 generates the state machines according to definitions of the specification state machine 402.

The master slave state machine 408 is configured for resolving collision between definitions of masters and slaves by different specs FSM 302. The collision occurs when one specification FSM 302 defines a master for a specific system-module while another specification FSM 302 defines a slave for the same system-module. The selection is based on a result of the analysis and/or resources and/or according to a spec. For example, if in a previous architecture a first state machine increased the performance and security when functioning as a master, the result of the algorithm is to choose the first state machine as the master.

The connection state machine 409 is configured for connecting the state machines and/or generating a hierarchy of state machines.

The state machines may be connected by a matrix 410. The matrix 410 can be software matrix or a hardware matrix. The matrix 410 can be software matrix and/or a hardware matrix. The matrixes 410 may be software and/or hardware implemented. The matrixes 410 may be built and/or rebuilt according to a result of analysis. The matrixes 410 may be scalable.

The state machines may be connected to other state machines in the same electronic entity (local state machines 411) and/or the state machines from another electronic entity (remote state machines 412).

Figure 5:
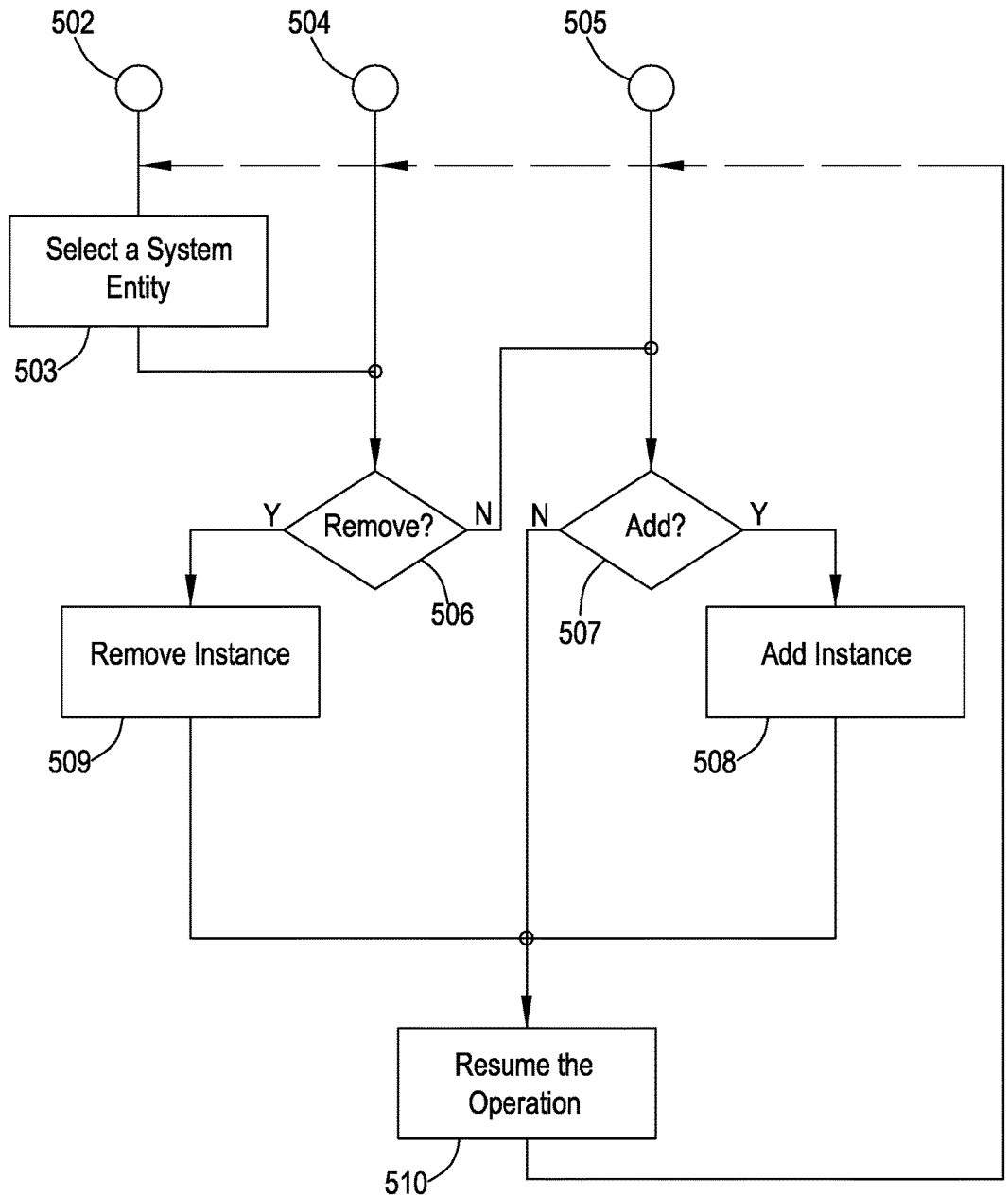
FIG. 5 shows a flowchart diagram of a method for managing a building block or a dynamic function, in accordance with some exemplary embodiments of the subject matter.

FIG. 5 shows a flowchart of a method for managing a building block or a dynamic function, in accordance with some exemplary embodiments of the subject matter. According to some embodiments, dynamic functions are activated or deactivated according to the result from the analysis and/or according to a spec. The result may be synchronous or asynchronous. That is to say, an activation of a dynamic function may be performed after or during an activating or deactivating a current dynamic function.

The operation may start at 502 or at 504 or at 505.

At 503, which occur if the operation starts at 502, a dynamic function is selected. For example a memory system-module may be selected.

At 506 a check is performed in order to conclude if a dynamic function has to be removed.

At 509, which occurs if the answer to 506 is yes, dynamic function is removed and the operation proceeds to 510 in which the operation resumes to 502 or 504 or 505.

At 507 a check is performed in order to conclude if an instance of the chosen a dynamic function has to be added.

At 508 the instance of the dynamic function is added to the system and the operation proceeds to 510 in which the operation resumes to 502 or 504 or 505. Adding and removing may be done by a three state buffer stack die.

Figure 6:
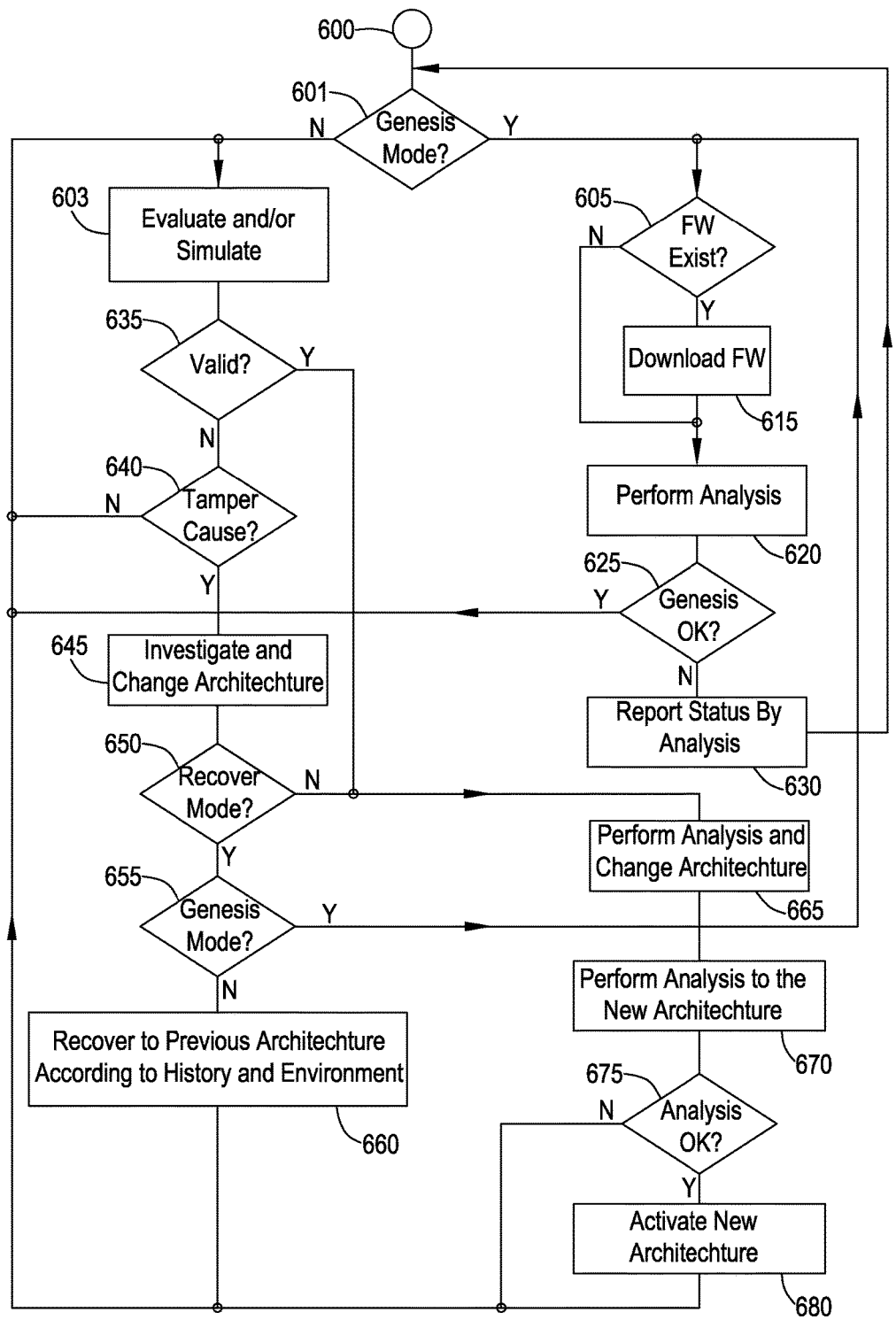
FIG. 6 shows a flowchart diagram of a scenario for building the system, in accordance with some exemplary embodiments of the subject matter.
Figure 7:
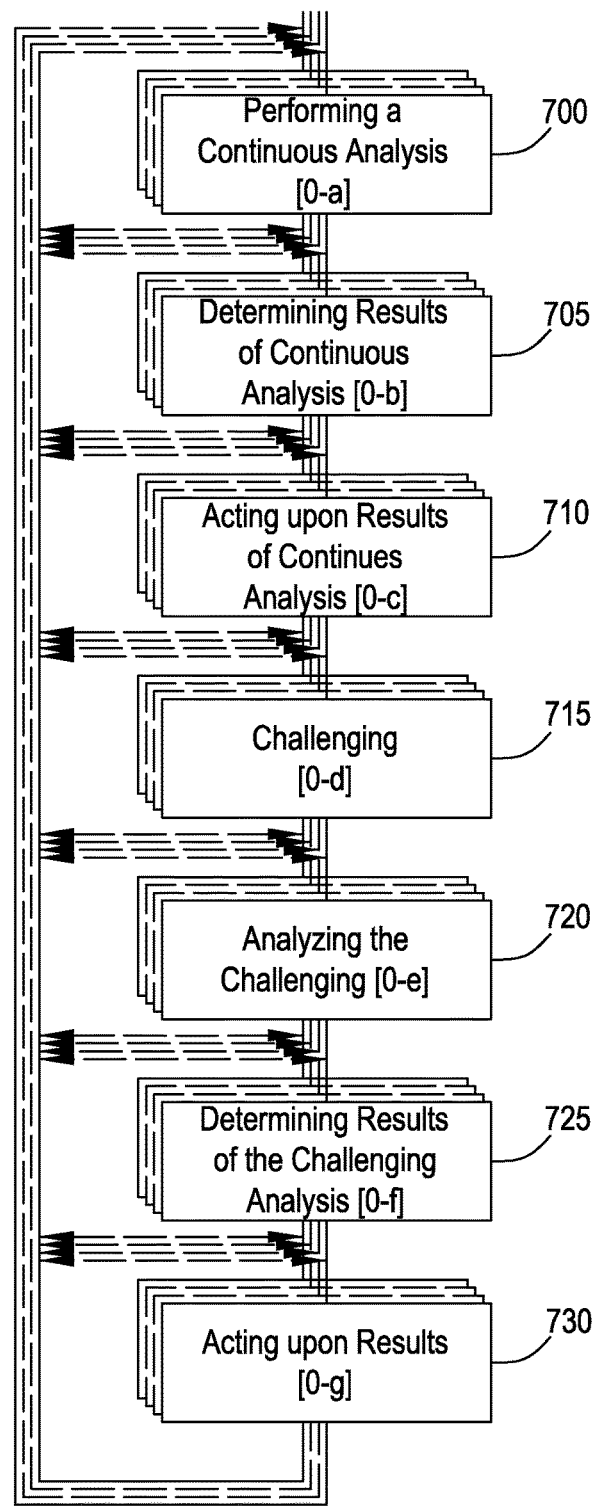
FIG. 7 shows a flowchart diagram of a scenario for generating dynamic functions and for modifying the architecture of dynamic functions in accordance with some exemplary embodiments of the subject matter.

FIG. 6 shows flowchart of a scenario for building the system in accordance with some exemplary embodiments of the subject matter. According to some embodiments the system starts at genesis mode. In some embodiments the genesis mode includes several system-methods built of building blocks such as flip flops and analog components with a predefined connectivity. When the system-method receives input, the system methods become a state machine. In some other embodiments the genesis mode includes specification of the architecture of the electronic entity that has to be generated. Such a specification may include files and or electronic logic. In some embodiments the methods and the state machines are generated from the specification and according to the analysis. In some embodiments the genesis mode includes one or more building blocks. The state machines build and/or rebuild state machines and/or dynamic functions according to the analysis. The state machines may activate and or deactivate other state machines and/or dynamic functions according to the analysis and/or according to a spec. The state machines may also change connectivity of other state machines and/or dynamic functions according to the analysis. The state machines may also change the internal and/or external environment of state machines and/or dynamic functions according to the analysis. The dynamic functions perform the distributed, adaptive, dynamic, correlated, unique analysis. The result of the analysis may include the votes of the dynamic functions. The minority votes may also be checked and learned in case the minority might give more impact on current and/or future same/different cases and/or scenarios. A trigger to FIG. 7 shows a flowchart diagram of a scenario for generating dynamic functions and for modifying the architecture of dynamic functions in accordance with some exemplary embodiments of the subject matter.

According to some embodiments dynamic functions within a chip dynamically and continuously perform self analysis or an analysis of other entities. The term other entities refer herein to other dynamic functions, to the chip, to an electronic entity connected and to the chip and to specification. An example of an electronic entity that is connected to a chip is a sensor. Such an analysis is term herein as continues analysis. Such continuous analysis may be performed in real time or off-line. Performing an offline analysis may be done by recording parameters and analyzing the recorded parameters.

According to some embodiments the dynamic functions may also dynamically and continuously perform self challenging or may challenge other entities. The dynamic function may then perform self analysis and/or an analysis of the other entities as a result of performing the challenge. Such an analysis is termed herein challenging analysis.

According to some embodiments the challenging analysis and the continuous analysis may be performed by any of the system functions or by a plurality of system functions. In the latter cases the analysis results may be determined by vote.

According to some embodiments the one or more system function may act upon the results of the continuous analysis and/or the challenging analysis. For example, the system function may build a new system function or may change its architecture or the architecture the other entities as a result of the analysis Referring now to the drawing:

The operation may start at 700 or at 715.

At 700 one or more system function performs a continuous analysis. The analysis may be done by evaluating the behavior and/or the environment of the dynamic functions and/or any other entity.

The analysis may be related to a security aspect of the dynamic function or any other entity. The security aspects include the resistance of the electronic entity to attacks. Such analysis may be done by evaluating of risk, for example, a tamper or the existence of a tamper. The risk evaluating may be as a result of detecting an attempt to attack/monitor/mislead/change/interact with the electronic entity and/or an attempt to insert an error in the electronic entity. The detecting may be performed by measuring parameters from sensors such as proximity sensor.

The analysis may be related to a performance aspect of the dynamic function or the other entities. Such analysis may be done by measuring parameters that are related to performance, such as time, power, results of functionality and operation, and by comparing and/or syncing and/or correlating and/or performing coverage, and/or qualifying and/or validating the parameters to expected parameters. The performance may be evaluated by emulating, qualifying, validating, predicting, simulating the behavior of the system function/chip/electronic entity as a result of performing a change in its architecture and/or according to ongoing results and/or statistics of results. The analysis may measure bus transaction and traffic power consumption.

The analysis may be related to usability aspect of the dynamic function or other entities. Such analysis may be done by analyzing the behavior of the user, for example, by using sensors such as proximity sensor, camera and microphone by evaluating the effect of an operation of a user on the electronic entity, The analysis may be related to maintainability aspect of the dynamic function or other entities. The analysis may be done by qualifying the dynamic function and/or an electronic entity and or the chip. The analysis may include analyzing statistics of failures after self-attacking, statistics of traffic. The maintainability aspects tests include the ability of the electronic entity to recover from errors.

The analysis may be related to the effect of an operation of a user on the dynamic function or other entities. The analysis may be done by tracing user activity (for example, mouse activity, gestures, movement, voice, behavior, functionality, image, pressure, proximity, ambient, bio and/or typing).

The analysis may be related to environment of the dynamic function or other entities. Such analysis may be done by monitoring and controlling sensors and measuring sensors parameters such as temperature.

The analysis may be related to any combination of the aspects described herein.

At 705 one or more dynamic functions determine the result of the analysis. The result of the analysis may be determined for example by calculating the combined results and by comparing the results to the threshold and by performing artificial intelligence functions.

At 710 one or more dynamic function may act upon the result of the analysis. In some embodiments the one or more dynamic function may generate another dynamic function. In some other embodiments the one or more dynamic function may change connectivity between dynamic functions or between an electronic entity that is connected to the chip. In some other embodiments the one or more dynamic function may change the environment of one or more dynamic function or any other entity. In some embodiments the one or more dynamic function may change the architecture of the dynamic function or any other entity. Generating a new dynamic function may be done by, for example, connecting one or more building blocks. The connecting may be done by a three state buffer, a priority switch, a mux, a transistor and a logic table. The generating and modifying the architecture may also be done by injecting signals and modifying environment parameters. For example increasing a clock rate may change temperature and the voltage. Modifying the architecture may also be done by modifying connectivity.

At 715 one or more dynamic function may perform self challenge or may challenge any other entity.

The challenging may done by any combination of the following operations: self-attacking and/or imitating, and/or misleading and/or reverse engineering, and/or emulating a behavior of a user and/or and predicting an attacks and or emulating a behavior of a dynamic function or other entities and/or emulating an architecture of a dynamic function and/or other entities. The self-attacking is for learning the behavior of the electronic entity as a result of an attack and for modifying the architecture of the electronic entity as a result of the learning. The self-attacking is for analyzing weaknesses of the electronic entity and for modifying the architecture of the electronic entity for overcoming the weaknesses. The self-attacking may be done by a system-modules or system functions that perform penetration testing. Examples of self-attacking are disconnecting connectivity between building blocks, initiating communication request with system function and thus imitating denial of service.

The challenging may also be done by authenticating and/or certifying the dynamic functions and/or other entities, by inserting and/or correcting and/or mitigating and/or improving and/or predicting an error to a dynamic function and/or other entities.

Challenging usability may be done by emulating a behavior of the user by inserting and/or correcting and/or mitigating and/or improving and/or predicting an error to a dynamic function and/or other entities.

Challenging maintainability may be done by diagnosing the dynamic function and/or other entities for qualifying and analyzing the behavior the risk and/or the performance after the insertion of the error, and/or evaluating a risk of attacking and/or predicting and/or improving a risk and/or a performance change and/or an environment change.

The challenging of any aspect may done by evaluating a behavior of the dynamic function and/or any other entity and by measuring differentiating between the behavior of evaluated environment and/or dynamic function and/or electronic entity and/or user and the real behavior of the environment and/or dynamic function and/or electronic entity and/or user. Such a differentiating may lead to changes in the architecture which may improve performance, security, maintainability and/or the interaction with the user.

The challenging may also be done by any dynamic function using tools such as spec, qualification, sequences, interfaces, behavioral capabilities, secured adaptive measurements tools, SPICE engine, logic analyzer, protocol analyzer, network analyzer, RF analyzer, Signal integrity, Simulation (digital, analog, mixed signal), SW debug, disassembler, Scripting tools, Synthesis, Place and route, linters, PCB design/debug, Mechanical design/debug, Physical design/debug, Silicon design/debug, SW design/debug, Compilers and/or linkers.

The challenge results may be stored and/or build as a dynamic function to avoid reverse engineering and/or attacking the internal environment and/or the external environment.

At 720 one or more dynamic function may analyze the result of the challenge as explained in 700.

At 725 one or more dynamic function determine the result of the analysis of the challenge as explained in 705.

At 730 one or more dynamic function may act upon the result of the analysis as explained in 710.

It should be noted that the operation described in FIG. 7 may be performed continuously and sporadically.

The flowchart and block diagrams in the Figures illustrate the architecture, functionality and operation of possible implementations of systems, methods and computer program products according to various embodiments of the present invention. In this regard, Each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", an and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for generating or modifying an architecture of an electronic entity; the method comprising the steps of:
within a integrated circuit, analyzing an aspect of said electronic entity; wherein said electronic entity having connectivity with said integrated circuit; wherein said aspect being one member of a group consisting of a security aspect of said integrated circuit, a functionality aspect of said integrated circuit, a performance aspect of said integrated circuit, a usability aspect of said integrated circuit, a reliability aspect of said integrated circuit, an environment aspect of said integrated circuit, hardware aspect of said integrated circuit, software aspect of said integrated circuit and maintainability aspect of said integrated circuit;
within said integrated circuit, analyzing results and providing analysis-results; and
within said integrated circuit, modifying or generating an architecture of said electronic entity with accordance to said analysis-results; wherein said architecture comprises one member of a group consisting of: one or more building blocks from which said electronic entity being built, output-structure or input-structure or behavior or stimuli of said building blocks, connectivity between said building blocks, connectivity between said integrated circuit and said electronic entity, operation of said electronic entity, functionality of said electronic entity, external environment of said electronic entity, internal environment of said electronic entity, internal environment of said building blocks, status of said electronic entity, status of said building blocks, parameters of said building blocks, dynamic function and parameters of said electronic entity.

2. A method for modifying or generating an architecture of an integrated circuit; the method comprises the steps of:
within said integrated circuit analyzing an aspect of said integrated circuit; wherein said aspect being one member of a group consisting of security, performance, usability, reliability, environment, functionality, hardware, software and maintainability aspect,
within said integrated circuit determining results of said analysis; and
within said integrated circuit modifying or generating architecture of said integrated circuit in accordance with said results, wherein said architecture comprises one member of a group consisting of: one or more building blocks from which said integrated circuit being built, output-structure or input-structure or behavior or stimuli of said building blocks, connectivity between said building blocks, connectivity between said integrated circuit and another electronic entity, operation of said integrated circuit, functionality of said integrated circuit, external environment of said integrated circuit, internal environment of integrated circuit, internal environment of said building blocks, status of said integrated circuit, status of said building blocks, parameters of said building blocks, dynamic function, and parameters of said integrated circuit; and wherein said modifying or generating comprises one member of a group consisting of amending parameters, generating, adding, removing, connecting, disconnecting, activating, deactivating, removing a generator dynamic function as a result of generating a second dynamic function by said generator, and injecting signals.

3. An integrated circuit operable for modifying or generating an architecture of an electronic entity, said integrated circuit comprises one or more dynamic functions wherein said one or more dynamic functions being operable for analyzing an aspect of said electronic entity; wherein said aspect being one member of a group consisting of security, performance, usability, reliability, environment, functionality, hardware, software and maintainability aspect; wherein said electronic entity having connectivity with said integrated circuit; wherein said dynamic function further operable for providing analysis-results of said analyzing and for modifying or generating an architecture of said electronic entity with accordance to said analysis-results; wherein said architecture comprises one member of a group consisting of: one or more building blocks from which said electronic entity being built, output-structure or input-structure or behavior or stimuli of said building blocks, connectivity between said building blocks, connectivity between said integrated circuit and said electronic entity, operation of said electronic entity, functionality of said electronic entity, external environment of said electronic entity, internal environment of said electronic entity, internal environment of said building blocks, status of said, electronic entity status of said building blocks, parameters of said building blocks, dynamic function and parameters of said electronic entity.

4. A integrated circuit; said integrated circuit comprises one or more dynamic functions; said one or more dynamic functions being operable for analyzing an aspect of said integrated circuit, determining results of said analysis and modifying or generating an architecture of said integrated circuit in accordance with said results; wherein said aspect being one member of a group consisting of security, performance, usability, reliability, environment, functionality, hardware, software and maintainability aspect; wherein said architecture comprises one member of a group consisting of: one or more building blocks from which said integrated circuit being built, output-structure or input-structure or behavior or stimuli of said building blocks, connectivity between said building blocks, connectivity between said integrated circuit and another electronic entity, operation of said integrated circuit, functionality of said integrated circuit, external environment of said integrated circuit, internal environment of integrated circuit, internal environment of said building blocks, status of said integrated circuit, status of said building blocks, dynamic function, parameters of said building blocks and parameters of said integrated circuit.

5. A design structure tangibly embodied in a non-transitory machine readable medium for designing, manufacturing of an integrated circuit said design structure comprising structure of said integrated circuit; said integrate circuit structure comprising one or more dynamic functions; said one or more dynamic functions being operable for analyzing an aspect of said integrated circuit, for determining results of said analysis and for modifying or generating architecture of said integrated circuit in accordance with said results; wherein said aspect being one member of a group consisting of security, performance, usability, reliability, environment, functionality, hardware, software and maintainability aspect; wherein said architecture comprises one member of a group consisting of: one or more building blocks from which said integrated circuit being built, output-structure or input-structure or behavior or stimuli of said building blocks, connectivity between said building blocks, connectivity between said integrated circuit and another electronic entity, operation of said integrated circuit, functionality of said integrated circuit, external environment of said integrated circuit, internal environment of integrated circuit, internal environment of said building blocks, status of said integrated circuit, status of said building blocks, dynamic function, parameters of said building blocks and parameters of said integrated circuit.

6. A design structure tangibly embodied in a non-transitory machine readable medium for designing, manufacturing of an integrated circuit said integrated circuit being operable for modifying or generating an architecture of an electronic entity, said integrated circuit comprises one or more dynamic functions wherein said one or more dynamic functions being operable for analyzing an aspect of said electronic entity; wherein said aspect being one member of a group consisting of security, performance, usability, reliability, environment, functionality, hardware, software and maintainability aspect; wherein said electronic entity having connectivity with said integrated circuit; wherein said dynamic function further operable for providing analysis-results of said analyzing and for modifying or generating an architecture of said electronic entity with accordance to said analysis-results; wherein said architecture comprises one member of a group consisting of: one or more building blocks from which said electronic entity being built, output-structure or input-structure or behavior or stimuli of said building blocks, connectivity between said building blocks, connectivity between said integrated circuit and said electronic entity, operation of said electronic entity, functionality of said electronic entity, external environment of said electronic entity, internal environment of said electronic entity, internal environment of said building blocks, status of said, electronic entity status of said building blocks, parameters of said building blocks, dynamic function and parameters of said electronic entity.

* * * * *